US011967080B2

(12) United States Patent
Mustafi et al.

(10) Patent No.: US 11,967,080 B2
(45) Date of Patent: *Apr. 23, 2024

(54) OBJECT LOCALIZATION FRAMEWORK FOR UNANNOTATED IMAGE DATA

(71) Applicant: Salesforce, Inc., San Francisco, CA (US)

(72) Inventors: Joy Mustafi, Hyderabad (IN); Lakshya Kumar, Ghaziabad (IN); Rajdeep Singh Dua, Hyderabad (IN)

(73) Assignee: Salesforce, Inc., San Francisco, CA (US)

( * ) Notice: Subject to any disclaimer, the term of this patent is extended or adjusted under 35 U.S.C. 154(b) by 277 days.

This patent is subject to a terminal disclaimer.

(21) Appl. No.: 17/316,373

(22) Filed: May 10, 2021

(65) Prior Publication Data
US 2021/0287401 A1    Sep. 16, 2021

Related U.S. Application Data

(63) Continuation of application No. 16/401,695, filed on May 2, 2019, now Pat. No. 11,004,236.

(51) Int. Cl.
*G06T 7/00*    (2017.01)
*G06F 18/21*   (2023.01)
(Continued)

(52) U.S. Cl.
CPC ............ *G06T 7/11* (2017.01); *G06F 18/2178* (2023.01); *G06T 7/75* (2017.01); *G06V 10/446* (2022.01);
(Continued)

(58) Field of Classification Search
CPC ... G06T 7/11; G06T 7/75; G06T 2207/20081; G06T 2207/20084; G06T 2207/20092;
(Continued)

(56) References Cited

U.S. PATENT DOCUMENTS 7,730,478 B2   6/2010   Weissman
7,779,039 B2   8/2010   Weissman et al.
(Continued)

OTHER PUBLICATIONS

Bradbury et al., "Quasi-Recurrent Neural Networks," Cornell University Library, Under review as a conference paper at ICLR 2017, arXiv:1611.01576v2, Nov. 21, 2016, pp. 1-11.
(Continued)

*Primary Examiner* — Van D Huynh
(74) *Attorney, Agent, or Firm* — Haynes and Boone, LLP

(57) ABSTRACT

A system is provided for object localization in image data. The system includes an object localization framework comprising a plurality of object localization processes. The system is configured to receive an image comprising unannotated image data having at least one object in the image, access a first object localization process of the plurality of object localization processes, determine first bounding box information for the image using the first object localization process, wherein the first bounding box information comprises at least one first bounding box annotating at least a first portion of the at least one object in the image, and receive first feedback regarding the first bounding box information determined by the first object localization process. The system is further configured to persist the image with the first bounding box information or access a second object localization process based on the first feedback.

21 Claims, 7 Drawing Sheets

(51) Int. Cl.
*G06T 7/11* (2017.01)
*G06T 7/73* (2017.01)
*G06V 10/44* (2022.01)
*G06V 10/764* (2022.01)
*G06V 10/82* (2022.01)
*G06V 10/96* (2022.01)

(52) U.S. Cl.
CPC ............ *G06V 10/764* (2022.01); *G06V 10/82* (2022.01); *G06V 10/96* (2022.01); *G06T 2207/20081* (2013.01); *G06T 2207/20084* (2013.01); *G06T 2207/20092* (2013.01); *G06T 2210/12* (2013.01)

(58) Field of Classification Search
CPC ....... G06T 2210/12; G06T 2207/20036; G06T 7/181; G06F 18/2178; G06V 10/446; G06V 10/764; G06V 10/82; G06V 10/96
USPC ........................................................ 382/103
See application file for complete search history.

(56) References Cited

U.S. PATENT DOCUMENTS

| | | | |
|---|---|---|---|
| 9,330,084 | B1 | 5/2016 | Kadambi et al. |
| 9,430,557 | B2 | 8/2016 | Bhat et al. |
| 9,495,355 | B2 | 11/2016 | Mungi et al. |
| 9,514,185 | B2 | 12/2016 | Mungi et al. |
| 9,535,894 | B2 | 1/2017 | Carrier et al. |
| 9,613,091 | B2 | 4/2017 | Mungi et al. |
| 9,619,261 | B2 | 4/2017 | Gaurav et al. |
| 9,684,876 | B2 | 6/2017 | Agarwalla et al. |
| 9,766,945 | B2 | 9/2017 | Gaurav et al. |
| 9,916,303 | B2 | 3/2018 | Mungi et al. |
| 10,133,732 | B2 | 11/2018 | Mungi et al. |
| 10,275,712 | B2 | 4/2019 | Bhat et al. |
| 10,275,713 | B2 | 4/2019 | Bhat et al. |
| 10,318,641 | B2 | 6/2019 | Mustafi et al. |
| 10,353,739 | B2 | 7/2019 | Gaurav et al. |
| 10,417,581 | B2 | 9/2019 | Agarwalla et al. |
| 10,426,551 | B2 | 10/2019 | Gupta et al. |
| 10,489,229 | B2 | 11/2019 | Mustafi et al. |
| 10,521,513 | B2 | 12/2019 | Mustafi et al. |
| 2016/0292153 | A1 | 10/2016 | Agarwalla et al. |
| 2017/0039192 | A1 | 2/2017 | Mustafi et al. |
| 2017/0052985 | A1 | 2/2017 | Guggilla et al. |
| 2017/0052988 | A1 | 2/2017 | Guggilla et al. |
| 2018/0012082 | A1* | 1/2018 | Satazoda .............. G06V 10/763 |
| 2018/0096457 | A1* | 4/2018 | Savvides .............. G06V 10/764 |
| 2018/0160894 | A1 | 6/2018 | Gupta et al. |
| 2019/0362265 | A1 | 11/2019 | Agarwalla et al. |
| 2020/0019799 | A1* | 1/2020 | Shen ..................... G06V 10/25 |
| 2020/0104646 | A1 | 4/2020 | Eno et al. |
| 2020/0285869 | A1* | 9/2020 | Mansour ................ G06N 5/046 |
| 2021/0073597 | A1* | 3/2021 | Han .................... G06F 18/2413 |

OTHER PUBLICATIONS

Chen et al., "Real-Time Vision-Based Hand Gesture Recognition using Haar-Like Features," Instrumentation and Measurement, Technology Conference—IMTC 2007, Warsaw Poland, May 1-3, 2007, pp. 1-6.

Gandhi, "R-CNN, Fast R-CNN, Faster R-CNN, YOLO—Object Detection Algorithms," retrieved on Nov. 8, 2019 from https://arxiv.org/pdf/1506.02640.pdf, pp. 1-9.

Han et al., "Deep Pyramidal Residual Networks," arXiv preprint arXiv:1610.02915, Oct. 10, 2016, pp. 1-9.

He et al., "Deep Residual Learning for Image Recognition," arXiv preprint arXiv:1512.03385, Dec. 10, 2015, pp. 1-15.

Hu et al., "Squeeze-and-Excitation Networks," arXiv preprint arXiv:1709.01507, Sep. 5, 2017, pp. 1-11.

Iandola et al., "DenseNet: Implementing Efficient ConvNet Descriptor Pyramids," Technical Report, University of California, Berkeley, arXiv:1404.1869, Apr. 7, 2014, pp. 1-11.

Image Color Quantization, cyanamous / Color-Quantization-using-K-Means, retrieved on Nov. 8, 2019 from https://github.com/cyanamous/Color-Quantization-using-K-Means, pp. 1.

Opencv, Contours: Getting Started, retrieved on Nov. 8, 2019 from https://docs.opencv.org/3.4/d4/d73/tutorial_py_contours_begin.html, pp. 1-2.

Redmon, "You only Look Once: Unified, Real-Time Object Detection, " arXiv:1506.02640v5, May 9, 2016, pp. 1-10.

Wikipedia, "Canny Edge Detector," retrieved from https://en.wikipedia.org/wiki/Canny_edge_detector, last edited on Oct. 25, 2019, pp. 1-7.

* cited by examiner

OBJECT LOCALIZATION FRAMEWORK FOR UNANNOTATED IMAGE DATA

CROSS REFERENCES

This application is a continuation of and claims priority under 35 U.S.C. 120 to co-pending and commonly-owned U.S. application Ser. No. 16/401,695, filed on May 2, 2019, which is hereby expressly incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure generally relates to image object localization for use in computer vision and image processing and more specifically to an object localization framework that provides bounding box information for unannotated image data.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A database system can store data or information, which may include annotated data used to train neural networks, as well as unannotated image data that requires annotation for neural network training purposes. In a customer relationship management (CRM) database, for example, this data or information can include image data for customers of the CRM system, which may be used for neural network training, object localization and detection, and/or other computer vision and image processing requirements. This data and information in a database system can be stored in the form of electronic image data or digital objects. When a user is interested in processing images for object detection, a neural network trained using annotated image data may process received image data to detect and identify objects. The annotated image data includes not just a classifier or class label of objects in images, but also includes bounding box information that describes the location of the objects in the images. Thus, using the input image and the trained neural network, the system responds with image detection results, which identifies the same or similar objects in images. This annotated data requires tens of thousands or more annotated images. However, for proper selection of bounding boxes in the annotated images, a user or administrator is required to manually select the objects in the images and place the bounding boxes over the objects so that a neural network can be trained in identifying the object. This not only takes a large amount of time and human resources, but further introduces bias and error based on human input. Moreover, proper training may require billions of such annotated images to recognize many or different objects, especially when images include multiple objects. As such, training of proper object detection systems requires large amounts of data in supervised models that leads to consumer issues and time expense.

Figure 1:
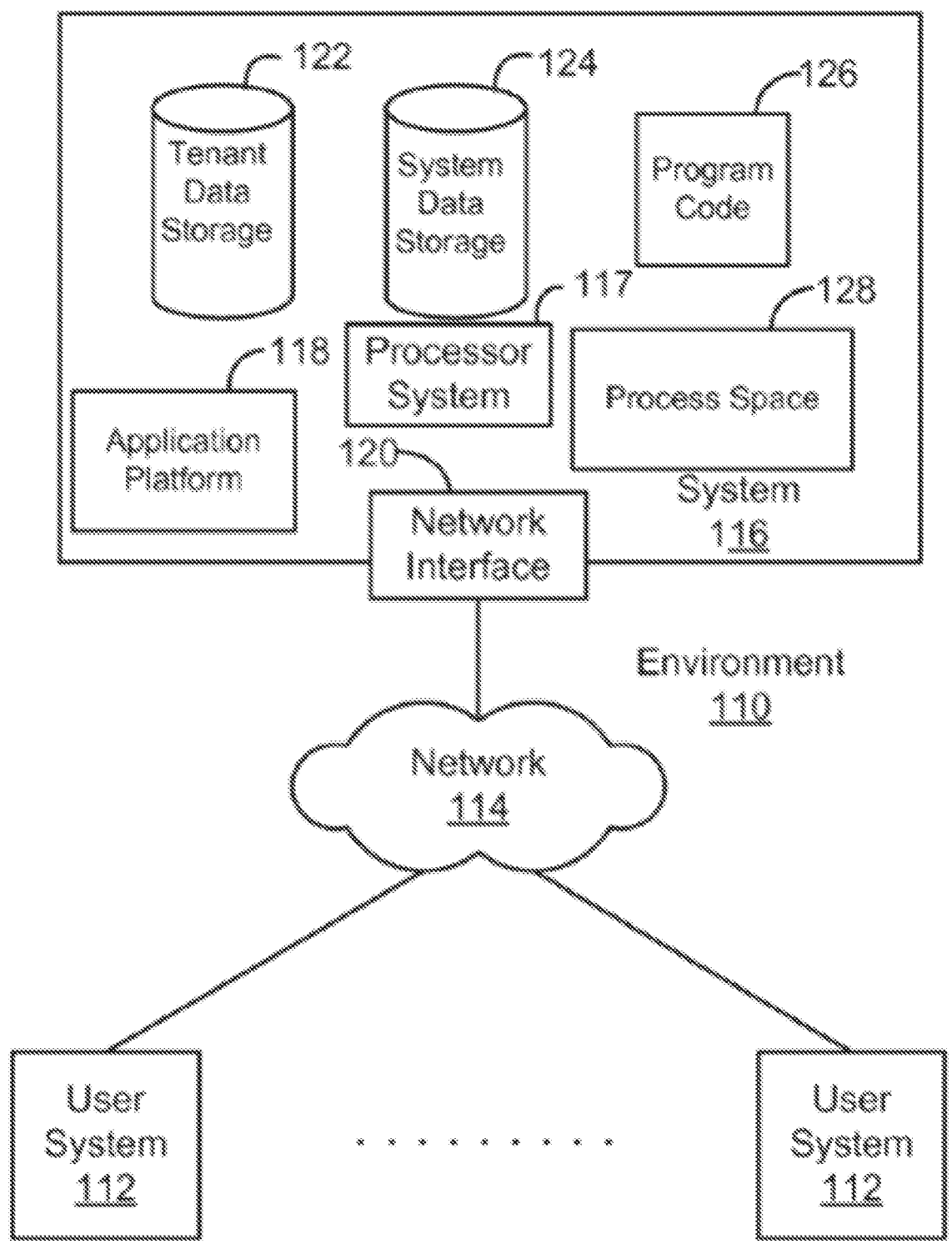
FIG. 1 illustrates a block diagram of an example environment wherein systems and methods for object localization in unannotated image data using an object localization framework may be provided and used according to some embodiments.

In the figures, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Overview

For a database system accessible by a plurality of separate organizations, such as a multi-tenant database system, methods, data structures, and systems are provided for generating bounding box information in unannotated image data through an object localization framework without requiring user input, selection, and creation of the bounding box information. The database system stores and provides an object localization framework that utilizes a pipeline of algorithmic processes to automate generation of the bounding box information from unannotated image data, such as image data that does not include bounding box information and class labels for objects within images.

The database system may therefore receive and store unannotated image data of images having one or more objects within the images. At least some images stored by the database system are associated with particular customers of the multi-tenant database system that request object localization for objects within images. Object localization refers to the process by which bounding boxes identifying one or more objects in an image is generated with classifiers or class labels for the objects and bounding boxes. This object localization process produces annotated data, which may then be used to train a neural network to identify the same or similar objects in other images through object detection. Object detection relates to the computer vision and image processing technology that detects instances of these semantic objects having classifiers or classes in digital images and videos. However, as neural networks require a large amount of annotated data, object localization is an intensive process to perform manually. Thus, a database system for customer relationship management (CRM) may provide this object localization framework to automate generation of bounding box information through a pipeline of algorithmic approaches.

The embodiments described herein provide methods, computer program products, and computer database systems for an object localization framework that generates bounding box information in unannotated image data. An online system provides users with access to online services. For example, the online system may be a web-based CRM system that provides employees of an enterprise with access to CRM software applications. As part of providing the services to users, the online system stores the object localization framework and unannotated image data, as well as resulting annotated data. The annotated data may be generated, for example, by users or administrators of the online system providing the object localization framework.

According to some embodiments, in a multi-tenant database system accessible by a plurality of separate and distinct organizations, a neural network model, and object localization framework is provided for generating annotated data used to train a neural network for object detection, taking into account the specificities of the unannotated image data, thereby enhancing the experience of users and organization when training neural networks for object detection.

Example Environment

The system and methods of the present disclosure can include, incorporate, or operate in conjunction with or in the environment of a database, which in some embodiments can implemented as a multi-tenant, cloud-based architecture. Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost-effective sharing of similar application features between multiple sets of users. In some embodiments, the multi-tenant architecture may provide the object localization framework client or server-side for use in object localization with unannotated image data, as discussed herein.

FIG. 1 illustrates a block diagram of an example environment 110 according to some embodiments. Environment 110 may include user systems 112, network 114, system 116, processor system 117, application platform 118, network interface 120, tenant data storage 122, system data storage 124, program code 126, and process space 128 for executing database system processes and tenant-specific processes, such as running applications as part of an application hosting service. In other embodiments, environment 110 may not have all of the components listed and/or may have other elements instead of, or in addition to, those listed above.

In some embodiments, the environment 110 is an environment in which an on-demand database service exists. A user system 112 may be any machine or system that is used by a user to access a database user system. For example, any of user systems 112 can be a handheld computing device, a mobile phone, a laptop computer, a notepad computer, a work station, and/or a network of computing devices. As illustrated in FIG. 1 (and in more detail in FIG. 2) user systems 112 might interact via a network 114 with an on-demand database service, which is system 116.

An on-demand database service, such as that which can be implemented using the system 116, is a service that is made available to users outside of the enterprise(s) that own, maintain or provide access to the system 116. As described above, such users do not need to necessarily be concerned with building and/or maintaining the system 116. Instead, resources provided by the system 116 may be available for such users' use when the users need services provided by the system 116—e.g., on the demand of the users. Some on-demand database services may store information from one or more tenants stored into tables of a common database image to form a multi-tenant database system (MTS). Accordingly, the "on-demand database service 116" and the "system 116" will be used interchangeably herein. The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image may include one or more database objects. A relational data base management system (RDBMS) or the equivalent may execute storage and retrieval of information against the data base object(s).

The application platform 118 may be a framework that allows the applications of system 116 to run, such as the hardware and/or software infrastructure, e.g., the operating system. In an embodiment, on-demand database service 116 may include an application platform 118 that enables creating, managing, and executing one or more applications developed by the provider of the on-demand database service, users accessing the on-demand database service via user systems 112, or third-party application developers accessing the on-demand database service via user systems 112.

The users of user systems 112 may differ in their respective capacities, and the capacity of a particular user system 112 might be entirely determined by permissions (permission levels) for the current user. For example, where a salesperson is using a particular user system 112 to interact with system 116, that user system has the capacities allotted to that salesperson. However, while an administrator is using that user system 112 to interact with system 116, that user system 112 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 114 is any network or combination of networks of devices that communicate with one another. For example, the network 114 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the "Internet" with a capital "I" that network will be used in many of the examples herein. However, it should be understood that the networks that the present embodiments might use are not so limited, although TCP/IP is a frequently implemented protocol.

The user systems 112 might communicate with system 116 using TCP/IP and, at a higher network level, use other common Internet protocols to communicate. Such as hypertext transfer protocol (HTTP), file transfer protocol (FTP), Andrew file system (AFS), wireless application protocol (WAP), etc. In an example where HTTP is used, user system 112 might include an HTTP client commonly referred to as a "browser" for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least for the users that are accessing that server, each of the plurality of servers has access to the MTS data; however, other alternative configurations may be used instead.

In some embodiments, the system 116, shown in FIG. 1, implements a web-based customer relationship management (CRM) system. For example, in one embodiment, system 116 includes application servers configured to implement and execute CRM software applications as well as provide related data, code, forms, webpages and other information to and from user systems 112 and to store to, and retrieve from, a database system related data, objects, and web page content. With a multi-tenant system, data for multiple tenants may be stored in the same physical database object. However, tenant data typically is arranged so that data of one tenant is kept logically separate from that of other tenants so that one tenant does not have access to another tenant's data, unless such data is expressly shared. In certain embodiments, the system 116 implements applications other than, or in addition to, a CRM application. For example, system 16 may provide tenant access to multiple hosted (standard and custom) applications, including a CRM application. User (or third-party developer) applications, which may or may not include CRM, may be supported by the application platform 118, which manages creation, storage of the applications into one or more database objects, and executing of the applications in a virtual machine in the process space of the system 116.

One arrangement for elements of the system 116 is shown in FIG. 1, including the network interface 120, the application platform 118, the tenant data storage 122 for tenant data 123, the system data storage 124 for system data 125 accessible to system 116 and possibly multiple tenants, the program code 126 for implementing various functions of the system 116, and the process space 128 for executing MTS system processes and tenant-specific processes, such as running applications as part of an application hosting service. Additional processes that may execute on system 116 include database indexing processes.

Several elements in the system shown in FIG. 1 include conventional, well-known elements that are explained only briefly here. For example, each of the user systems 112 could include a desktop personal computer, workstation, laptop, notepad computer, PDA, cell phone, or any wireless access protocol (WAP) enabled device or any other computing device capable of interfacing directly or indirectly to the Internet or other network connection. Each of the user systems 112 typically runs an HTTP client, e.g., a browsing program, such as Microsoft's Internet Explorer browser, Netscape's Navigator browser, Opera's browser, or a WAP-enabled browser in the case of a cell phone, notepad computer, PDA or other wireless device, or the like, allowing a user (e.g., subscriber of the multi-tenant database system) of the user systems 112 to access, process, and view information, pages, and applications available to it from the system 116 over the network 114. Each of the user systems 112 also typically includes one or more user interface devices, such as a keyboard, a mouse, trackball, touch pad, touch screen, pen or the like, for interacting with a graphical user interface (GUI) provided by the browser on a display (e.g., a monitor screen, liquid crystal display (LCD) monitor, light emitting diode (LED) monitor, organic light emitting diode (OLED) monitor, etc.) in conjunction with pages, forms, applications, and other information provided by the system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application(s) including computer code to run using a central processing unit such as the processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nano-systems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

According to one embodiment, the system 116 is configured to provide webpages, forms, applications, data and media content to the user (client) systems 112 to support the access by the user systems 112 as tenants of the system 116. As such, the system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., object-oriented data base management system (OODBMS) or relational database management system (RDBMS)) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
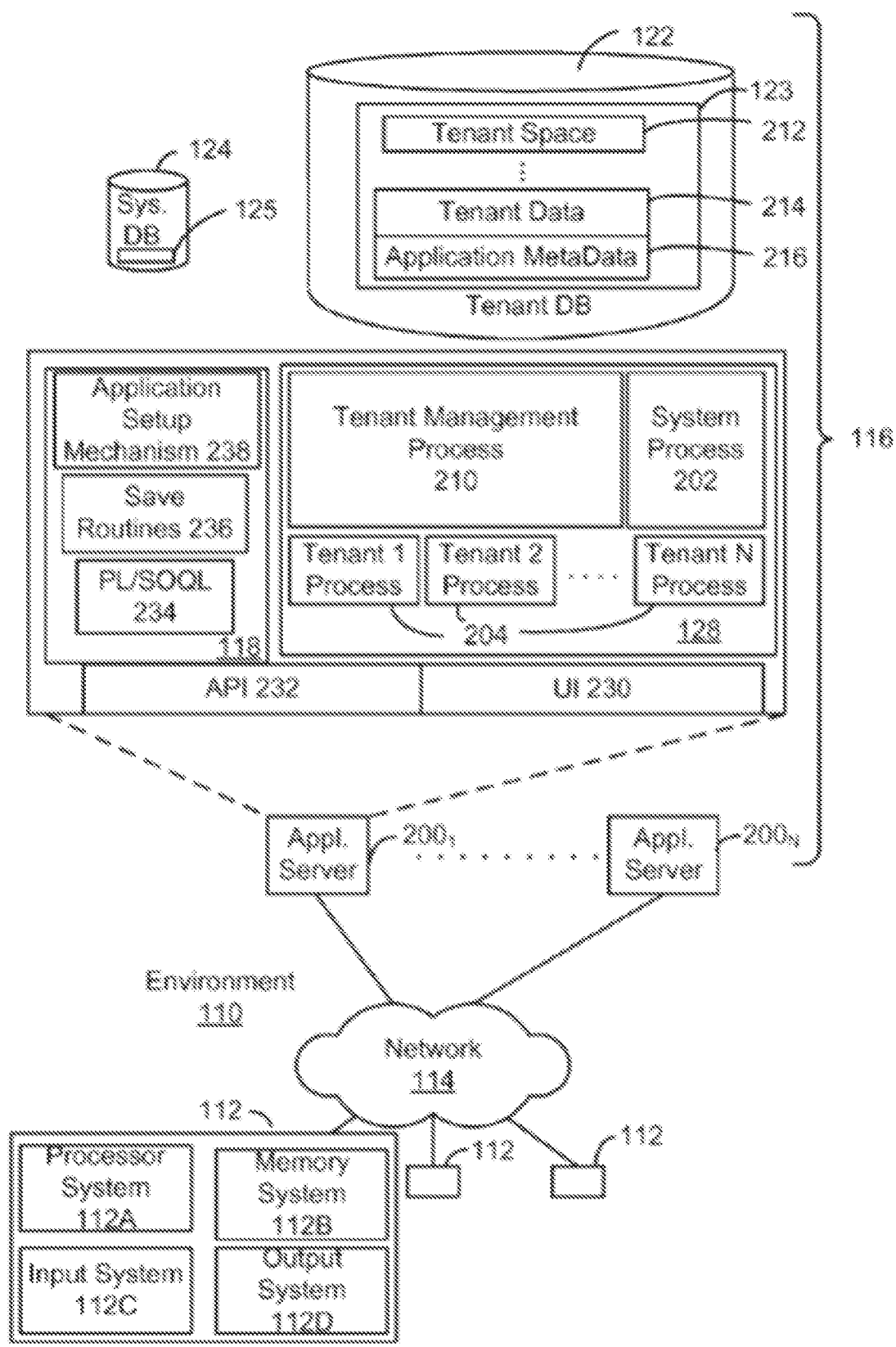
FIG. 2 illustrates a block diagram of another example environment according to some embodiments.

FIG. 2 also illustrates the environment 110, which may be used to implement embodiments described herein. FIG. 2 further illustrates elements of system 116 and various interconnections, according to some embodiments. FIG. 2 shows that each of the user systems 112 may include a processor system 112A, a memory system 112B, an input system 112C, and an output system 112D. FIG. 2 shows the network 114 and the system 116. FIG. 2 also shows that the system 116 may include the tenant data storage 122, the tenant data 123, the system data storage 124, the system data 125, a user interface (UI) 230, an application program interface (API) 232, a PL/Salesforce.com object query language (PL/SOQL) 234, save routines 236, an application setup mechanism 238, applications servers $200_1$-$200_N$, a system process space 202, tenant process spaces 204, a tenant management process space 210, a tenant storage area 212, a user storage 214, and application metadata 216. In other embodiments, environment 110 may not have the same elements as those listed above and/or may have other elements instead of, or in addition to, those listed above.

The user systems 112, the network 114, the system 116, the tenant data storage 122, and the system data storage 124 were discussed above in FIG. 1. Regarding the user systems 112, the processor system 112A may be any combination of one or more processors. The memory system 112B may be any combination of one or more memory devices, short-term, and/or long-term memory. The input system 112C may be any combination of input devices, such as one or more keyboards, mice, trackballs, scanners, cameras, and/or interfaces to networks. The output system 112D may be any combination of output devices, such as one or more monitors, printers, and/or interfaces to networks. As shown in FIG. 2, the system 116 may include the network interface 120 (of FIG. 1) implemented as a set of HTTP application servers 200, the application platform 118, the tenant data storage 122, and the system data storage 124. Also shown is system process space 202, including individual tenant process spaces 204 and the tenant management process space 210. Each application server 200 may be configured to access tenant data storage 122 and the tenant data 123 therein, and the system data storage 124 and the system data 125 therein to serve requests of the user systems 112. The tenant data 123 might be divided into individual tenant storage areas 212, which can be either a physical arrangement and/or a logical arrangement of data. Within each tenant storage area 212, the user storage 214 and the application metadata 216 might be similarly allocated for each user. For example, a copy of a user's most recently used (MRU) items might be stored to the user storage 214. Similarly, a copy of MRU items for an entire organization that is a tenant might be stored to the tenant storage area 212. The UI 230 provides a user interface and the API 232 provides an application programmer interface to the system 116 resident processes and to users and/or developers at the user systems 112. The tenant data and the system data may be stored in various databases, such as one or more Oracle™ databases.

The application platform 118 includes an application setup mechanism 238 that supports application developers' creation and management of applications, which may be saved as metadata into tenant data storage 122 by the save routines 236 for execution by subscribers as one or more tenant process spaces 204 managed by the tenant management process space 210, for example. Invocations to such applications may be coded using PL/SOQL 234 that provides a programming language style interface extension to the API 232. Some embodiments of PL/SOQL language are discussed in further detail in U.S. Pat. No. 7,730,478, filed Sep. 21, 2007, entitled, "Method and System For Allowing Access to Developed Applications Via a Multi-Tenant On-Demand Database Service," which is incorporated herein by reference. Invocations to applications may be detected by one or more system processes, which manage retrieving the application metadata 216 for the subscriber, making the invocation and executing the metadata as an application in a virtual machine.

Each application server 200 may be communicably coupled to database systems, e.g., having access to the system data 125 and the tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. Transfer Control Protocol and Internet Protocol (TCP/IP) are typical protocols for communicating between application servers 200 and the database system. However, it will be apparent to one skilled in the art that other transport protocols may be used to optimize the system depending on the network connection used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, therefore, an interface system implementing a load balancing function (e.g., an F5 Big-IP load balancer) is communicably coupled between the application servers 200 and the user systems 112 to distribute requests to the application servers 200. In one embodiment, the load balancer uses a least connections algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, the system 116 is multi-tenant, wherein the system 116 handles storage of, and access to, different objects, data and applications across disparate users and organizations.

As an example of storage, one tenant might be a company that employs a sales force where each salesperson uses the system 116 to manage his or her sales process. Thus, a user might maintain contact data, leads data, customer follow-up data, performance data, goals and progress data, etc., all applicable to that user's personal sales process (e.g., in the tenant data storage 122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 116 that are allocated at the tenant level while other data structures might be managed at the user level. Because a MTS might support multiple tenants including possible competitors, the MTS should have security protocols that keep data, applications, and application use separate. Also, because many tenants may opt for access to a MTS rather than maintain their own system, redundancy, up-time, and backup are additional functions that may be implemented in the MTS. In addition to user-specific data and tenant specific data, the system 116 might also maintain system level data usable by multiple tenants or other data. Such system level data might include industry reports, news, postings, and the like that are sharable among tenants.

In certain embodiments, the user systems 112 (which may be client systems) communicate with the application servers 200 to request and update system-level and tenant-level data from the system 116 that may require sending one or more queries to the tenant data storage 122 and/or the system data storage 124. The system 116 (e.g., an application server 200 in the system 116) automatically generates one or more structured query language (SQL) statements (e.g., one or more SQL queries) that are designed to access the desired information. The system data storage 124 may generate query plans to access the requested data from the database.

In a database system, such as system 116 shown and described with respect to FIGS. 1 and 2, data or information may be organized or arranged in categories or groupings. Each database can generally be viewed as a collection of objects, such as a set of logical tables, containing data fitted into predefined categories. A "table" is one representation of a data object and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields.

In a customer relationship management (CRM) system, for example, these categories or groupings can include various standard case tables for a case submitted to the system and the responses to the case, including help requests, data processing requests, annotated data generation requests, and other customer requests. For example, a CRM database may include a table that describes a customer request and may include the customer data and resulting response. In a CRM database and system providing an object localization framework that utilizes a pipeline of algorithmic approaches, machine learning processes, and/or neural networks to locate and classify objects in images, the CRM database may include one or more tables representing unannotated image data and resulting annotated image data. The annotated image data may include customer results from the unannotated image data and may further be used to train a neural network provided by the CRM system. In some multi-tenant database systems, tables might be provided for use by all tenants or may be only viewable by some tenants and agents (e.g., users and administrators) of the system.

In some multi-tenant database systems, tenants may be allowed to create and store custom objects, or they may be allowed to customize standard entities or objects, for example by creating custom fields for standard objects, including custom index fields. Systems and methods for creating custom objects as well as customizing standard objects in a multi-tenant database system are described in further detail in U.S. Pat. No. 7,779,039, filed Apr. 2, 2004, entitled "Custom Entities and Fields in a Multi-Tenant Database System," which is incorporated herein by reference. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

The multi-tenant database system 116 described above may be accessed and used by a number of customers, clients, or other persons (generally, "users") regarding object localization in image data. To facilitate interaction between the database system 116 and the user, a search bar, voice interface, data upload process, or similar user interface tool is provided. The interface tool allows a user to submit unannotated image data requiring object localization through the framework provided herein (e.g., object bounding box generation identifying an object, as well as object class labels for classification). The interface tool further allows a user to see the results of object localization, provide feedback on the resulting bounding box generation, request processing using different object localization processes discussed herein, and receive the resulting annotated data used for neural network training.

For neural networks providing object detection (e.g., detecting instances of semantic objects of a certain class in images or videos), large amounts of annotated data are required to receive good object detection results. For example, tens of thousands or more annotated images having bounding box information of an object and classification may be required to identify an object. Moreover, for detection of multiple different types of objects, class labels, and other semantic items in images, billions of different annotated images showing those different semantic items may be requires. Thus, a customer of the CRM system must provide large amounts of manpower to manually label images. This introduces human error into the process of annotating data. Furthermore, a database system may require large amounts of resources to store different sets of image data. It is a difficult task to train neural networks. In a multi-tenant system, such as Salesforce.com, a customer may be required to utilize a large amount of resources to train a neural network for object detection. Continuing with the example, because the customer may be interest in quickly training a neural network without using valuable manpower and database resources, it may be desirable or preferable that the unannotated image data is annotated using an automated framework that requires no or minimal user input to generate bounding box information and other annotations in unlabeled or unannotated image data. As such, according to some embodiments, systems and methods are provided for generating annotated data for object detection neural networks.

Neural Model

According to some embodiments, in a multi-tenant database system accessible by a plurality of separate and distinct organizations, such as system 116 shown and described with respect to FIGS. 1 and 2, a neural network model and object localization framework are provided for object localization in unannotated image data.

Figure 3:
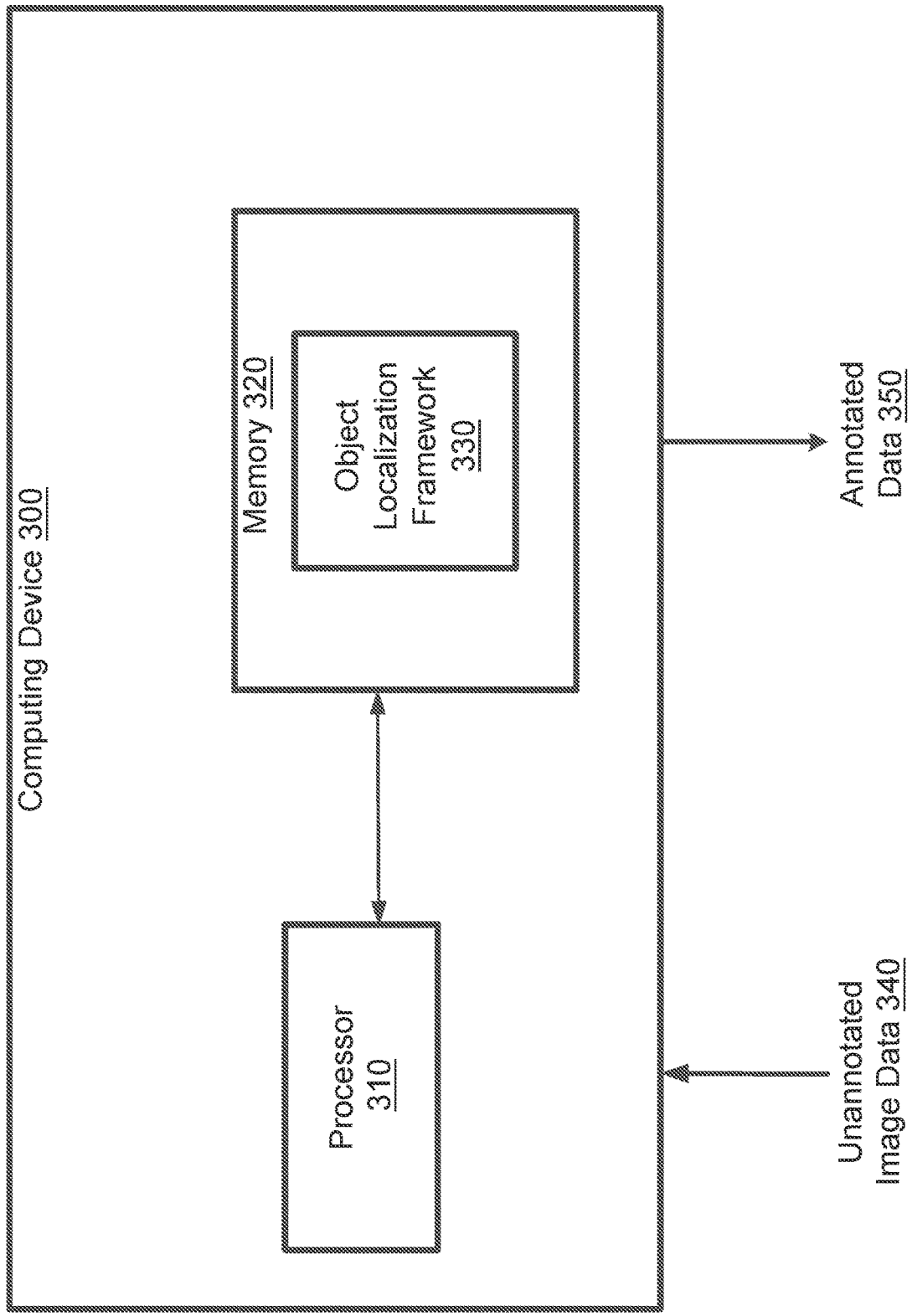
FIG. 3 is a simplified diagram of a computing device according to some embodiments.

FIG. 3 is a simplified diagram of a computing device 300 according to some embodiments. As shown in FIG. 3, computing device 300 includes a processor 310 coupled to memory 320. Operation of computing device 300 is controlled by processor 310. And although computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in computing device 300. Computing device 300 may be implemented as a stand-alone subsystem, as a board added to a computing device, and/or as a virtual machine.

Memory 320 may be used to store software executed by computing device 300 and/or one or more data structures used during operation of computing device 300. Memory 320 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities. In some examples, memory 320 may include non-transitory, tangible, machine readable media that includes executable code that when run by one or more processors (e.g., processor 310) may cause the one or more processors to perform any of the methods described further herein.

As shown, memory 320 includes an object localization framework 330. Object detection deals with computer vision and image processing that detects objects within images based on image data and object location. Object localization focuses on generating annotated, or otherwise training, data used to train a neural network in object identification and detection within images and videos. Object localization is performed on unannotated image data that includes one or more images or videos having one or more objects within the image data. Object localization provides bounding box information in the image data, where one or more bounding boxes are placed over and/or encompassing one or more objects within the image to identify the objects location and appearance within the image data. Thus, bounding boxes describe where objects are located in images and/or video. The bounding box information may further include class labels or classifiers of the object, such as the semantic classification of the object (e.g., human, building, vehicle, bottle, can, and the like).

Once data is annotated with object localization data, it may be used to train a neural network that executes an algorithm for object detection, such as "You Only Look Once" (YOLO), Region-Convoluted Neural Network (R-CNN or RCNN), Fast-RCNN, and Faster-RCNN networks. Neural networks have demonstrated great promise as a technique for automatically analyzing real-world information with human-like accuracy. In general, neural network models receive input information and make predictions based on the input information. For example, a neural network may be used for object detection in image and video data. Whereas other approaches to analyzing real-world information may involve hard-coded processes, statistical analysis, and/or the like, neural networks learn to make predictions gradually, by a process of trial and error, using a machine learning process. A given neural network model may be trained using many training examples, proceeding iteratively until the neural network model begins to consistently make similar inferences from the training examples that a human might make. For example, neural network models may be trained using annotated image data having bounding boxes for objects and class labels of those objects. Neural network models have been shown to outperform and/or have the potential to outperform other computing techniques in a number of applications. However, these neural network models require large amounts of annotated image data to train the network and provide object detection. Thus, previous object detection solutions have not dealt with unannotated image data that does not include object localization data, bounding boxes, and class labels.

Object localization framework 330 may be used to implement and provide object localization processes and feature described further herein in a pipeline of algorithmic solutions to generate bounding boxes in unannotated image data. In some examples, object localization framework 330 may be associated or provided with a server or client-side application and service that executes on or is accessible by computing device 300. According to some embodiments, the object localization framework 330 may be a framework built and integrated for a standard client provided to computing device 300 when utilizing the multi-tenant database system described herein to create, manage, and execute applications and application data. This is described in more detail below.

After implementing and executing the object localization framework 330, in some embodiments, the object localization provided by object localization framework 330 is global for the multi-tenant database system, such as system 116, and applied to or used for all organizations or tenants whose users or customers utilize system 116 for data object generation, management, and use. Computing device 300 may receive or intake unannotated image data 340 (e.g., images and/or videos without bounding boxes or class labels for objects within the data) from a user of an organization or tenant accessing the database system. Unannotated image data 340 can be any type data in that it can take the form of multi-media content, including images, videos, and the like. In some embodiments, unannotated image data 340 is not constrained, restricted, or required to be in a particular form. Computing device 300 can receive the unannotated image data 340 through a user interface.

The computing device 300, using the object localization modules and processes of object localization framework 330, generates annotated data 350, which results from the unannotated image data 340 being processed using the object localization modules and processes. For example, for a customer (e.g., a user or an organization of the system), the computing device 300 may input or provide some initial unannotated image data 340 or unannotated image data 340 may be generated during use of services and applications provided by the multi-tenant database system. The user may then request that unannotated image data 340 be processed using object localization framework 330 and one or more networked databases of the multi-tenant database system to generate annotated data 350 used to train a neural network in object detection. An example of the relevant input data for the object localization processes is described in reference to FIG. 5A.

Object localization framework 330 may include at least one object localization module compatible with unannotated image data 340 to determine bounding box information within unannotated image data 340. However, object localization framework 330 may also include multiple object localization modules utilized for determination of bounding box information, such four different algorithmic approaches to bounding box determination that may separately determine bounding boxes in unannotated image data and/or be implemented based on feedback of determined bounding boxes from one or more of the object localization modules and processes. Object localization framework 330 may process unannotated image data 340 using one or more of the object localization modules to generate bounding box information and output annotated data 350 based on feedback of the bounding boxes (e.g., success/failure of bounding box determination by an object localization module and/or acceptance or rejection of the bounding box determination). Object localization framework 330 may step through each of the object localization approaches based on the success or failure of the previous object localization approach. Once the bounding box information for unannotated image data 340 is accepted, annotated data 350 may be generated. Thus, annotated data 350 includes unannotated image data 340 having the image data annotated with at least bounding boxes identifying objects in the image data, as well as class identifiers of the objects in some embodiments. An example of the resulting annotated data having bounding boxes for image objects is described in reference to FIG. 5B.

Figure 4A:
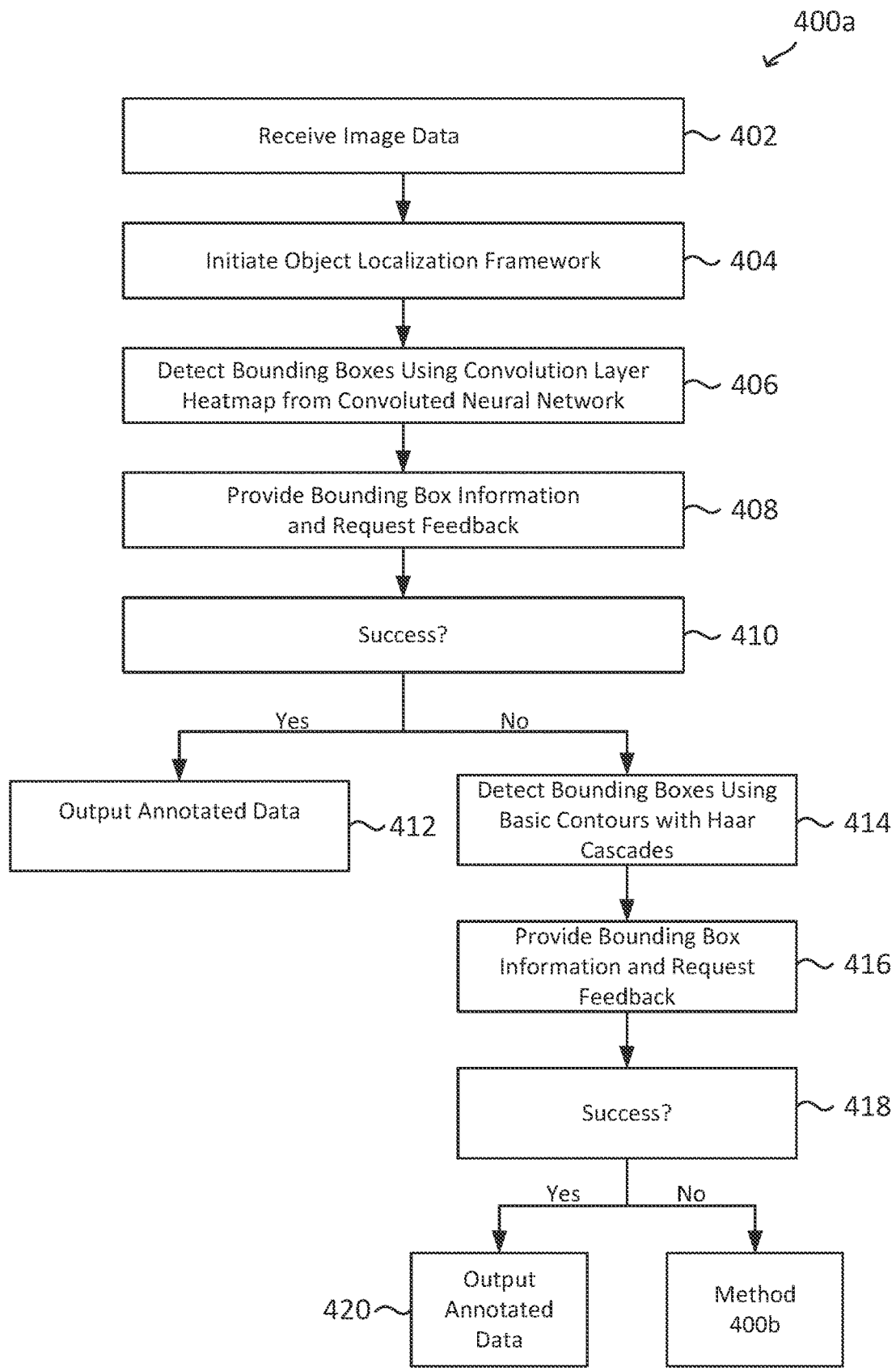
FIG. 4A is a simplified diagram of a method for generating bounding box information for image objects in unannotated image data through two initial object localization algorithms according to some embodiments.
Figure 4B:
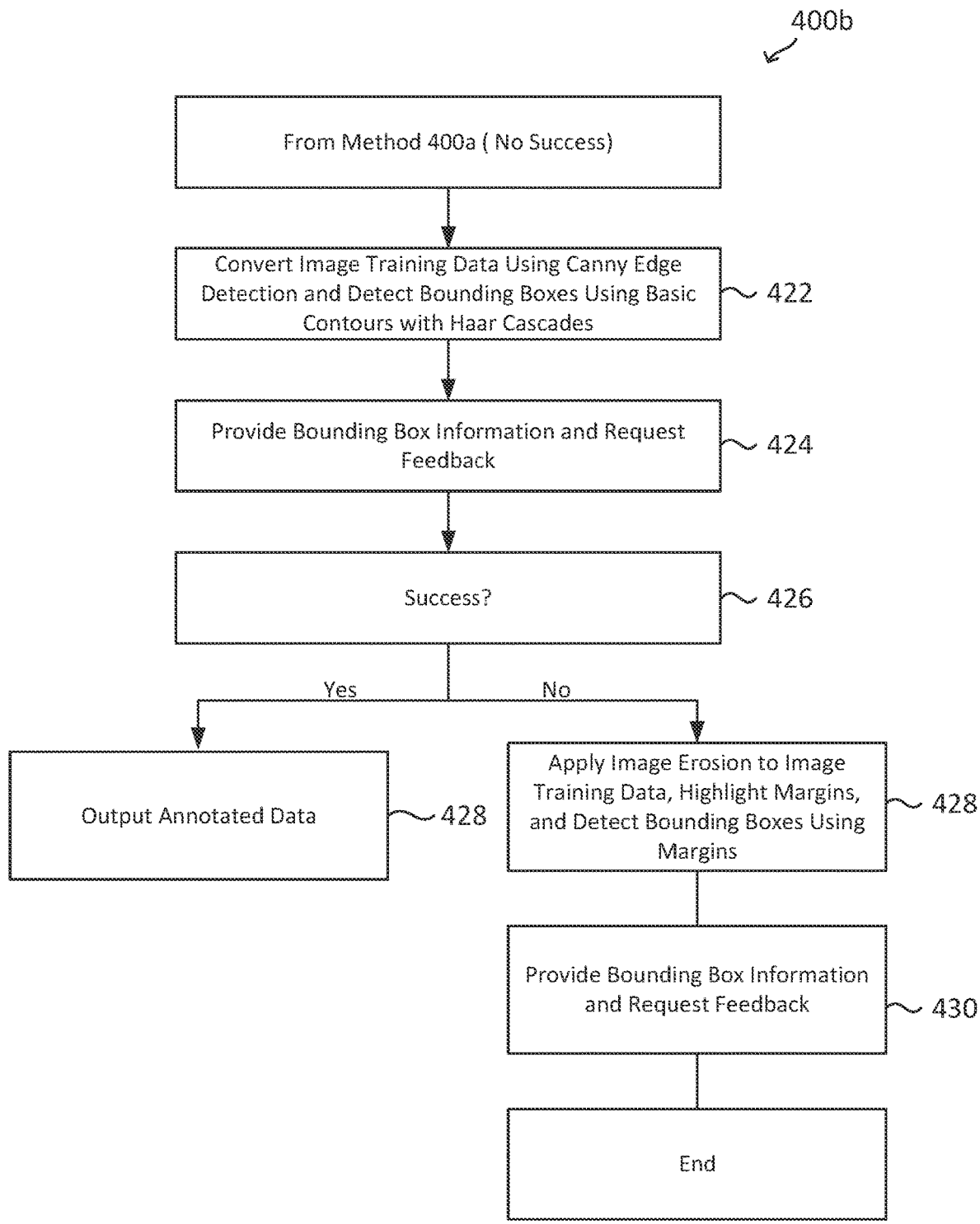
FIG. 4B is a simplified diagram of a method for generating bounding box information for image objects in unannotated image data through two additional object localization algorithms according to some embodiments.
Figure 5A:
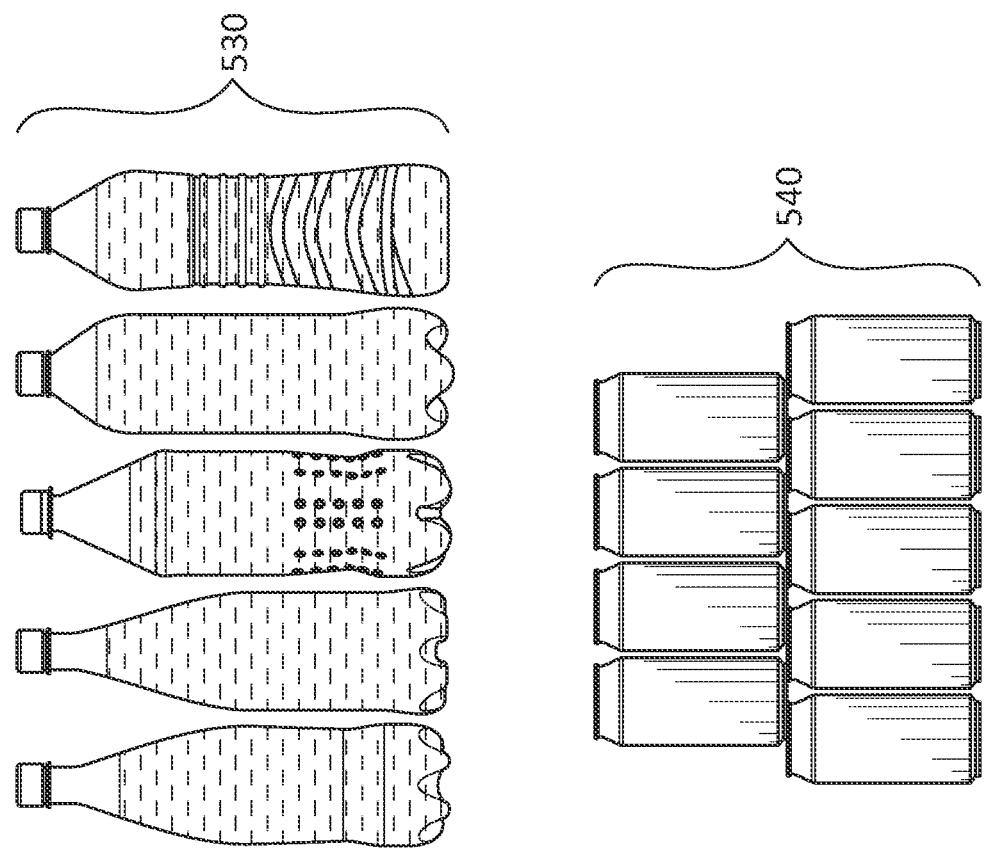
FIG. 5A is a simplified diagram illustrating unannotated image data processed by an object localization framework to generate bounding box information for image objects according to some embodiments.
Figure 5A:
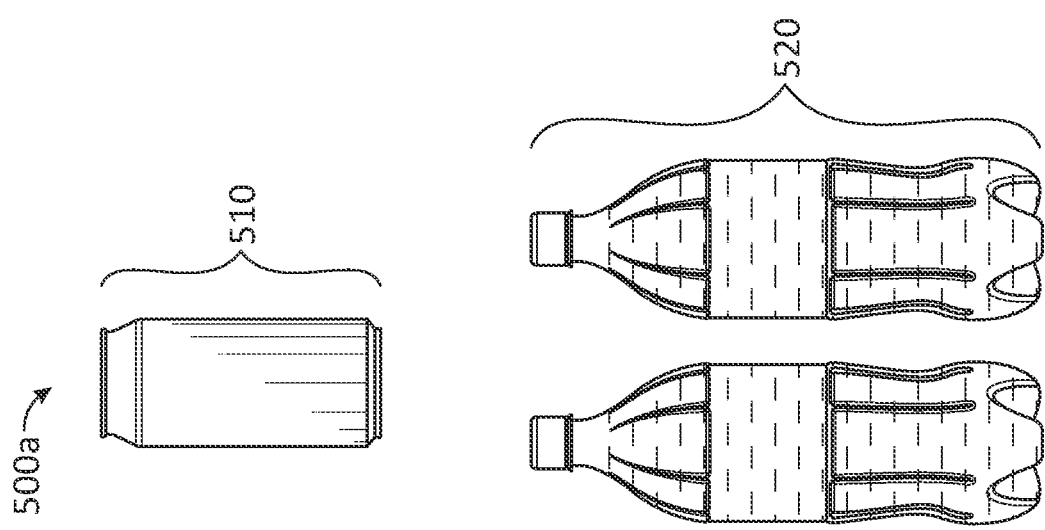
Figure 5B:
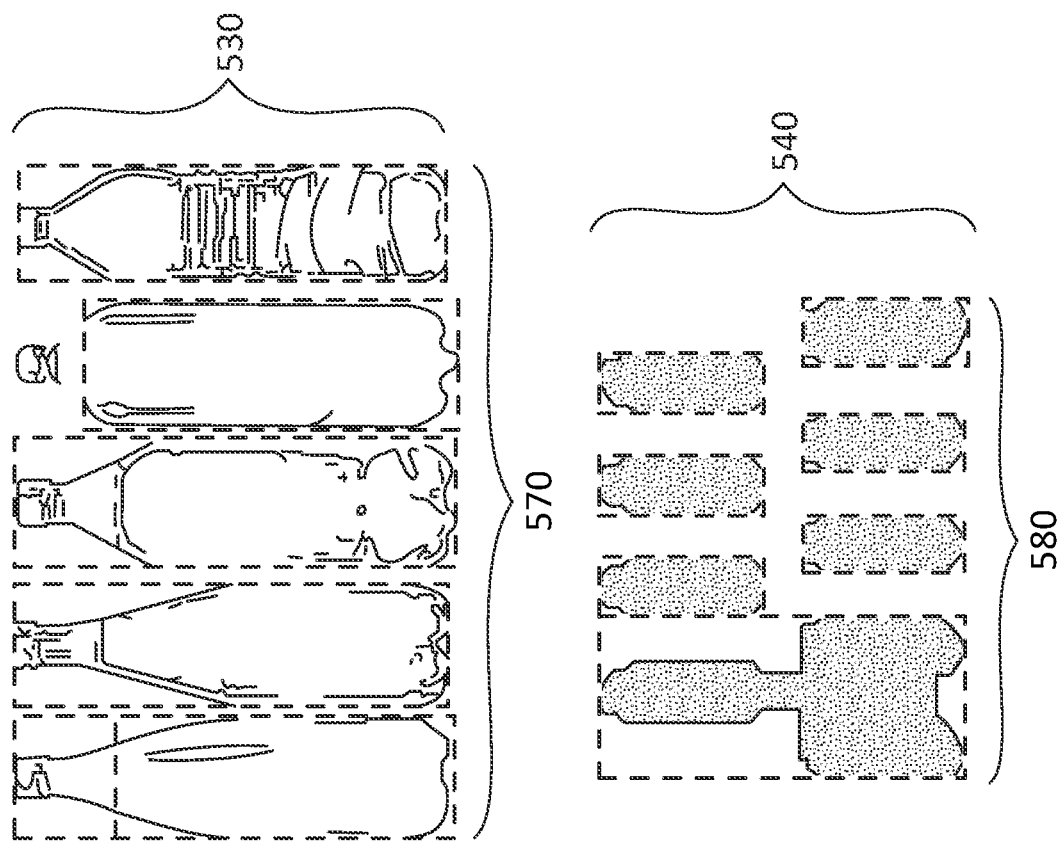
FIG. 5B is a simplified diagram illustrating annotated image data for an object detection neural network having bounding box information generated through an object localization framework according to some embodiments.
Figure 5B:
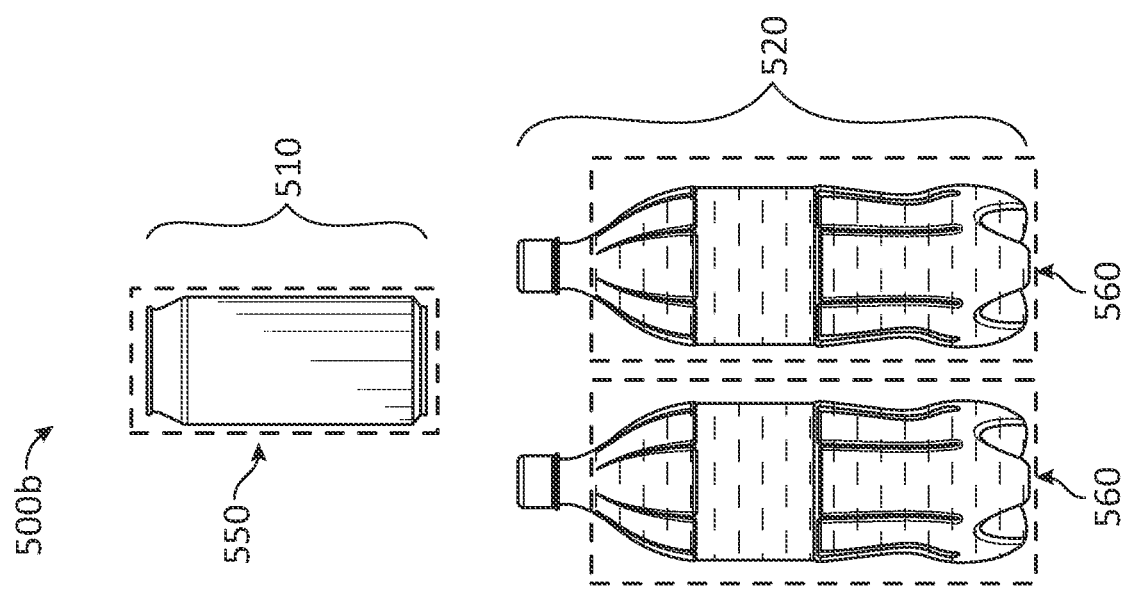

FIG. 4A is a simplified diagram of a method for generating bounding box information for image objects in unannotated image data through two initial object localization algorithms according to some embodiments. FIG. 4B continues the process of FIG. 4A and is a simplified diagram of a method for generating bounding box information for image objects in unannotated image data through two additional object localization algorithms according to some embodiments. In some embodiments, object localization described in method 400a through method 400b of FIG. 4A and FIG. 4B, respectively, can be implemented and performed using object localization framework 330 of computing device 300. FIG. 5A is a simplified diagram illustrating unannotated image data processed by an object localization framework to generate bounding box information for image objects according to some embodiments. FIG. 5B is a simplified diagram illustrating annotated data for an object detection neural network having bounding box information generated through an object localization framework according to some embodiments.

One or more of the processes 402-430 of methods 400a-400b may be implemented, at least in part, in the form of executable code stored on non-transitory, tangible, machine-readable media that when run by one or more processors may cause the one or more processors to perform one or more of the processes 402-430. In some embodiments, methods 400a-400b can be performed by one or more computing devices in environment 110 of FIGS. 1 and 2.

The model of object localization framework 330 uses deep learning algorithms and approaches to predict bounding box information in unannotated image data stored by a database system (e.g. CRM system 116) based on objects found within the images. In some embodiments, these include images and videos having one or more objects that a customer would like detected in additional images by an object detection neural network. The images and/or video may be provided by customers of the CRM system for generation of annotated data having the bounding box information.

To accomplish this, and with reference to FIGS. 4A, 4B, 5A, and 5B, the method 400a starts with a process 402. At process 402, object localization framework 330 receives image data for training the neural model so that it is able to predict other semantic instances of objects within images and videos. The image data corresponds to unannotated data at least lacking any bounding box information for identification of objects in the image data and may also lack class labels or classifiers of those objects. The raw image data may include images and/or videos provided by a user or customer of the CRM system for determination of the bounding box information and annotation of the data with object localization data (e.g., bounding boxes and class labels for objects). The image data may include objects that the user requests to have identified with bounding boxes. The image data may correspond to a large corpus of data, such as thousands or more images or videos that include the object(s) that are required to be localized to train a neural network in object detection. Examples of this are illustrated in FIG. 5A.

For example, in environment 500a of FIG. 5A, an image 510 includes a single soda can, an image 520 includes two bottles, an image 530 includes five bottles, and an image 540 includes nine soda cans. Thus, each of images 510-540 include a different number of objects (e.g., 1, 2, 5, and 9 respectively) within the raw image data. Images 510-540 may correspond to unannotated image data 340 provided to object localization framework 330 for object localization of the cans and bottles in images 510-540. Each of images 510-540 may be more appropriately or successfully processed to generate bounding boxes for the object(s) in images 510-540 using a different processing algorithm, machine learning process, and/or neural network that identify the location of the object(s) in images 510-540. As discussed herein, images 510-540 may therefore be used to produce bounding box information for annotated data 350, which may then be used to train a neural network.

At a process 404, the object localization framework is initiated so that object localization may be performed on the image data. Object localization framework 330 may be provided client or server-side to a customer or other user of a CRM system, and may be initiated by the client device or server. Once initiated, unannotated image data 340 is provided to object localization framework 330 for processing. For example, images 510-540 may be provided to object localization framework 330 for processing.

Bounding boxes are detected using convolution layer heatmaps from a convoluted neural network (CNN), at process 406. For example, VGG-16 is a CNN that includes sixteen convolution blocks or layers used to generate the bounding boxes for an input image. In order to generate the bounding boxes, the gradient of the class score with respect to neurons activated by each block/layer may be computed, which each may then be mapped to the original image using these generated "heatmaps" of the image. Thus, the convolution layer heatmaps of the image may include data used to determine the bounding box information that attempts to localize the object(s) in the image. Heatmaps correspond to data or analysis of the input image that designates potential screen or image object location based on analysis by the CNN, thereby allowing the bounding boxes to be overlaid onto the image (e.g., by overlaying the heatmap onto the image to designate nodes or areas of neuron activation in the image) and designate a location of an object in the image.

In other embodiments, other types of neural networks may be utilized, such as a recurrent neural network (RNN), a long-term short-term memory (LSTM), or one or more recurrent units (GRUs). A LSTM or GRU is a specific model of a RNN. The model of the CNN, RNN, or other neural network may include or be implemented with a multi-layer or deep neural network or neural model, having one or more layers. According to some embodiments, examples of multi-layer neural networks include the ResNet-32, DenseNet, PyramidNet, SENet, AWD-LSTM, AWD-QRNN and/or the like neural networks. The ResNet-32 neural network is described in further detail in He, et al., "Deep Residual Learning for Image Recognition," arXiv:1512.03385, submitted on Dec. 10, 2015; the DenseNet neural network is described in further detail in Iandola, et al., "Densenet: Implementing Efficient Convnet Descriptor Pyramids," arXiv:1404.1869, submitted Apr. 7, 2014, the PyramidNet neural network is described in further detail in Han, et al., "Deep Pyramidal Residual Networks," arXiv:1610.02915, submitted Oct. 10, 2016; the SENet neural network is described in further detail in Hu, et al., "Squeeze-and-Excitation Networks," arXiv:1709.01507, Sep. 5, 2017; the AWD-LSTM neural network is described in further detail in Bradbury, et al., "Quasi-Recurrent Neural Networks," arXiv:1611.01576, submitted on Nov. 5, 2016; each of which are incorporated by reference herein.

However, process 406 may work best with images having a single object for localization. For example, process 406 may work best with image 510, but may fail to detect or detect incorrect bounding boxes with images 520-540 that contain multiple soda cans or bottles. In this regard, the CNN may generate incorrect bounding box size, placement with respect to the object(s), object detection, or other object localization information when multiple similar or the same object are in an image. For example, the convolution layer heatmap may designate multiple activation zones or may detect a large activation zone when an image includes nearby objects. Thus, as process 408, bounding box information is provided, and feedback is request, for example, by providing the bounding boxes with unannotated image data 340 so that the bounding boxes annotate the image data and attempt to locate the objects within the images or videos. The resulting output may therefore correspond to annotated data, which may be output to a customer, administrator, or other user to verify the accuracy and success of the bounding boxes in identifying object location within the image data. For example, image 510 from environment 500a is shown in environment 500b of FIG. 5B with bounding box information determined from convolution layer heatmaps of a CNN. In environment 500b, image 510 is shown with bounding box 550 that captures the location of the soda can within the image. Bounding box 550 is shown over or outlining the soda can to show the soda can's position and location within image 510. Bounding box 550 may correspond to a bounding box determined from one of the convolution layer heatmaps of a CNN, such as VGG-16. However, in other convolution layers or blocks, different bounding boxes may result from the neural networks particular convolution layer's heatmap of the image. In this regard, different convolution layer heatmaps may better capture the soda can in image 510 or may capture more, less, or other objects.

At process 410, the success of computing the bounding box information using the convolution layer heatmaps may be determined. The success may be determined by receiving feedback from the request for feedback at process 408. A customer, administrator, or user may view the resulting bounding box generated through the CNN convolution layers, and may accept the bounding boxes, thereby indicating success of the initial object localization process in detecting the bounding box. If this feedback indicates success, then method 400a proceeds to process 412 where the annotated data having the bounding box information used to train a neural network in object detection is output, such as annotated data 350 that results from object localization framework 330. Thus, the one or more images may persist with the bounding box(es), which may be provided to a user for use with object detection in other images.

However, in the event that the feedback indicates failure of the bounding box(es) to correctly detect the object(s) in the image data, method 400a proceeds to process 414 where bounding boxes are detected using basic contours with Haar cascades. In this process, object contours are detected using a neural network or other process for edge detection. Haar cascades may be used for edge feature detection of edges or contours, as well as other image features, such as lines, a four-rectangle feature, and the like. Thus, Haar cascades may detect Haar-Features in an image by moving a X×X (e.g., 3×3) kernel over an image and emphasizing features that may define the object contours, while smoothing others. Such a process may be used to detect contours to objects and therefore generate bounding boxes that capture or encapsulate the object based on the contours (e.g., the corners, edges, etc.).

Process 414 may serve to better identify multiple objects within an image but may still fail for cluttered images or objects in images having different contour lines and/or shapes. For example, in environment 500a, image 520 includes two soda bottles. Object localization framework 330 may fail to independently capture both bottles using CNN convolution layer heatmaps. However, using contour detection with Haar cascades, bounding box information for each bottle (e.g., two different bounding boxes) may be detected for image 520. In environment 500b, bounding boxes 560 show two independent bounding boxes for the two bottles in image 520. Thus, the second object localization process in the algorithmic pipeline of object localization framework 330 may provide better bounding box information for unannotated image data 340. Image 520 with bounding boxes 560 may therefore correspond to annotated image data. Thus, at process 416, the bounding box information is provided, and feedback is requested for the accuracy and/or success of the bounding box detection and object localization. This output data may therefore correspond to image 520 with bounding boxes 560 in environment 500b. The user reviewing the output data indicates whether the object localization process was successful, at process 428. If success is indicated and the bounding box(es) are accepted, then method 400a proceeds to process 420, where the annotated data is output, such as annotated data 350 provided by object localization framework 330. Thus, the bounding boxes may persist in the image data.

However, if the bounding box information is indicated as failing to properly locate the object(s) in the image data, method 400a proceeds to method 400b of FIG. 4B. In method 400b, the image data is next converted using canny edge detection or a canny edge detector to an "edge" image that displays the edges, contours, and other lines in the image, at process 422. Canny edge detection applies a detection algorithm to reduce noise, find intensity gradient of the image, perform non-maximum pixel suppression, and perform hysteresis thresholding to identify the "strong" edges in the image. Once the strong edges are identified, bounding box information is detected using basic contours with Haar cascades as previously discussed, at process 422.

This third object localization process may assist in further identifying multiple objects in an image. For example, image 530 in environment 500a includes multiple soda bottles, and may therefore require multiple different bounding boxes, which may not be detected when close together or overlapping from the algorithmic approaches of processes 406 and 416. However, through converting the image using canny edge detection, the edges may be more pronounced and therefore the objects better detected. In environment 500b, the converted edge image is shown of image 530 with the five bottles converted to show their edges. Bounding boxes 570 are then detected using basic contours with Haar cascades. Thus, bounding boxes 570 identify the location of the bottle objects within image 530.

At process 424, bounding box information is provided, and feedback is requested, for example, from the user requesting object localization data for image data. The user may view image 530 with bounding boxes 570 and determine whether the bounding boxes properly locate the objects within the image. Feedback of the success or failure of process 422 is received, at process 426. If success is indicated, method 400b proceeds to process 428 where annotated data is output, such as annotated data 350 from object localization framework 330. This may therefore correspond to bounding boxes 570 with image 530, for example, bounding boxes 570 overlaid onto unannotated image data 340.

If failure is instead indicated at process 426, then method 400b proceeds to process 428. At process 428, a fourth object localization process is performed where image erosion is applied to the image data, margins are then highlighted, and bounding boxes are detected using the margins. For example, flood filling may be applied to the original image and thresholding may also be applied to the image so that everything in the background becomes black and everything in the foreground becomes while. This allows for removal of particular image data so that the image is converted into the foreground. Double erosion may then be applied to highlight the margins. Contour detection is then applied to detect the contours of the objects after image erosion and highlighting of the objects in the foreground. The contour detection allows for detection of the bounding box(es) for the object(s) in the image. In environment 500a, image 540 is shown with nine different soda cans in close proximity. Thus, the first three object localization processes may fail to create bounding boxes for each individual object or soda can in image 540. However, process 428 may generate bounding boxes 580 shown in environment 500b with image 540 after image erosion is applied and margins are highlighted so that contours may be detected. At process 430, bounding box information is provided, and feedback is requested, for example, from the user that is requesting the object localization data for unannotated image data 340. Thus, image 540 may be output with bounding boxes 580 as annotated data 350 from object localization framework 330. The user may then indicate the success or failure of the object localization process, which may then be used to determine whether the image data is to be annotated with bounding box information based on the aforementioned object localization processes.

As discussed above and further emphasized here, FIGS. 4A, 4B, 5A, and 5B are merely examples of an object localization framework 330 and corresponding methods 400a-400b for training and use which should not unduly limit the scope of the claims. One of ordinary skill in the art would recognize many variations, alternatives, and modifications.

Some examples of computing devices, such as computing device 300, may include non-transitory, tangible, machine readable media that include executable code that when run by one or more processors (e.g., processor 310) may cause the one or more processors to perform the processes of methods 400a-400b. Some common forms of machine readable media that may include the processes of methods 400a-400b are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications. Thus, the scope of the present application should be limited only by the following claims, and it is appropriate that the claims be construed broadly and in a manner consistent with the scope of the embodiments disclosed herein.

What is claimed is:

1. A system for identifying objects in image data, the system comprising:
   an input interface configured to receive the image data including an object in one or more images corresponding to the image data;
   a non-transitory memory storing a neural network based object localization model and a plurality of processor-executable instructions for generating annotation data including bounding boxes for the object using one or more bounding box operations; and
   one or more hardware processors execute the plurality of processor-executable instructions to perform operations comprising:
      generating a first set of annotation data including a first bounding box for the object using a first bounding box operation
      receiving, via the input interface, feedback on the first set of annotation data; and
      determining whether to generate a second set of annotation data including a second bounding box for the object using a second bounding box operation based on the feedback on the first set of annotation data.

2. The system of claim 1, wherein the first bounding box operation comprises utilizing the neural network to generate convolution layer heatmaps of the object in the one or more images.

3. The system of claim 1, wherein the in response to the feedback being the first bounding box not representing the object in the one or more images:
   generating the second bounding box for the object using the second bounding box operation, wherein the second bounding box operation comprises using basic contours in the one or more images from Haar cascades;
   receiving, via the input interface, second feedback on the second set of annotation data; and
   determining whether to generate a third set of annotation data including a third bounding box for the object using a third bounding box operation based the second feedback on the second set of annotation data.

4. The system of claim 3, wherein in response to the second feedback being the second bounding box not representing the object in the one or more images:
   generating the third bounding box for the object using the third bounding box operation, wherein the third bounding box operation comprises converting the one or more images using canny edge detection and applying basic contours in the one or more converted images from Haar cascades;
   receiving, via the input interface, third feedback on the third set of annotation data; and
   determining whether to generate a fourth set of annotation data including a fourth bounding box for the object using a fourth bounding box operation based the third feedback on the third set of annotation data.

5. The system of claim 4, wherein in response to the third feedback being the third bounding box not representing the object in the one or more images:
   generating the fourth bounding box for the object using the fourth bounding box operation, wherein the fourth bounding box operation comprises applying image erosion to the one or more images and highlighting margins among the at least one object in the one or more images after the image erosion;
   receiving, via the input interface, fourth feedback on the fourth set of annotation data; and
   determining whether to output the fourth set of annotation data including the fourth bounding box based on the fourth feedback.

6. The system of claim 1, wherein in response to the feedback being the first bounding box representing the object in the one or more images, outputting the first set of annotation data.

7. The system of claim 1, wherein the neural network based object localization framework is trained using an unsupervised learning operation with unannotated image data for a plurality of objects.

8. A method for identifying objects in image data, the method comprising:
   receiving the image data including an object in one or more images corresponding to the image data;
   generating, via a neural network based object localized framework, a first set of annotation data including a first bounding box for the object using a first bounding box operation;
   receiving feedback on the first set of annotation data; and
   determining whether to generate, via the neural network based object localized framework, a second set of annotation data including a second bounding box for the object using a second bounding box operation based on the feedback on the first set of annotation data.

9. The method of claim 8, wherein the first bounding box operation comprises utilizing the neural network to generate convolution layer heatmaps of the object in the one or more images.

10. The method of claim 8, wherein in response to the feedback being the first bounding box not representing the object in the one or more images:
    generating the second bounding box for the object using the second bounding box operation, wherein the second bounding box operation comprises using basic contours in the one or more images from Haar cascades;
    receiving second feedback on the second set of annotation data; and
    determining whether to generate, via the neural network based object localized framework, a third set of annotation data including a third bounding box for the object using a third bounding box operation based on the second feedback on the second set of annotation data.

11. The method of claim 10, wherein in response to the second feedback being the second bounding box not representing the object in the one or more images:
generating the third bounding box for the object using the third bounding box operation, wherein the third bounding box operation comprises converting the one or more images using canny edge detection and applying basic contours in the one or more converted images from Haar cascades;
receiving third feedback on the third set of annotation data; and
determining whether to generate, via the neural network based object localized framework, a fourth set of annotation data including a fourth bounding box for the object using a fourth bounding box operation based on the third feedback on the third set of annotation data.

12. The method of claim 11, wherein in response to the third feedback being the third bounding box not representing the object in the one or more images:
generating the fourth bounding box for the object using the fourth bounding box operation, wherein the fourth bounding box operation comprises applying image erosion to the one or more images and highlighting margins among the at least one object in the one or more images after the image erosion;
receiving fourth feedback on the fourth set of annotation data; and
determining whether to output the fourth set of annotation data including the fourth bounding box based on the fourth feedback.

13. The method of claim 8, wherein in response to the first bounding box representing the object in the one or more images, outputting the first set of annotation data.

14. The method of claim 8, wherein the neural network based object localization framework is trained using an unsupervised learning operation with unannotated image data for a plurality of objects.

15. A non-transitory machine-readable medium having stored thereon instructions for performing a method comprising machine executable code which when executed by at least one machine, causes the machine to:
receive the image data including an object in one or more images corresponding to the image data;
generate, via a neural network based object localized framework, a first set of annotation data including a first bounding box for the object using a first bounding box operation;
receiving feedback on the first set of annotation data; and
determine whether to generate, via the neural network based object localized framework, a second set of annotation data including a second bounding box for the object using a second bounding box operation based on the feedback on the first set of annotation data.

16. The non-transitory machine-readable medium of claim 15, wherein the first bounding box operation comprises utilizing the neural network to generate convolution layer heatmaps of the object in the one or more images.

17. The non-transitory machine-readable medium of claim 15, wherein the in response to the feedback being the first bounding box not representing the object in the one or more images:
generating the second bounding box for the object using the second bounding box operation, wherein the second bounding box operation comprises using basic contours in the one or more images from Haar cascades;
receiving, via the input interface, second feedback on the second set of annotation data; and
determining whether to generate a third set of annotation data including a third bounding box for the object using a third bounding box operation based the second feedback on the second set of annotation data.

18. The non-transitory machine-readable medium of claim 17, wherein in response to the second feedback being second bounding box not representing the object in the one or more images:
generating the third bounding box for the object using the third bounding box operation, wherein the third bounding box operation comprises converting the one or more images using canny edge detection and applying basic contours in the one or more converted images from Haar cascades;
receiving, via the input interface, third feedback on the third set of annotation data; and determining whether to generate a fourth set of annotation data including a fourth bounding box for the object using a fourth bounding box operation based the third feedback on the third set of annotation data.

19. The non-transitory machine-readable medium of claim 18, wherein in response to the third feedback being the third bounding box not representing the object in the one or more images:
generating the fourth bounding box for the object using the fourth bounding box operation, wherein the fourth bounding box operation comprises applying image erosion to the one or more images and highlighting margins among the at least one object in the one or more images after the image erosion;
receiving, via the input interface, fourth feedback on the fourth set of annotation data; and determining whether to output the fourth set of annotation data including the fourth bounding box based on the fourth feedback.

20. The non-transitory machine-readable medium of claim 15, wherein in response to the feedback being the first bounding box representing the object in the one or more images, outputting the first set of annotation data.

21. The non-transitory machine-readable medium of claim 15, wherein the neural network based object localization framework is trained using an unsupervised learning operation with unannotated image data for a plurality of objects.

* * * * *